United States Patent
Sakuma

(10) Patent No.: US 10,681,314 B2
(45) Date of Patent: Jun. 9, 2020

(54) MOVING IMAGE SPLITTING DEVICE AND MONITORING METHOD

(71) Applicant: NEXPOINT CO., LTD., Tokyo (JP)

(72) Inventor: Akihiro Sakuma, Tokyo (JP)

(73) Assignee: NEXPOINT CO., LTD., Tokyo (JP)

( * ) Notice: Subject to any disclaimer, the term of this patent is extended or adjusted under 35 U.S.C. 154(b) by 0 days.

(21) Appl. No.: 16/301,548

(22) PCT Filed: Mar. 3, 2017

(86) PCT No.: PCT/JP2017/008399
§ 371 (c)(1),
(2) Date: Nov. 14, 2018

(87) PCT Pub. No.: WO2017/203790
PCT Pub. Date: Nov. 30, 2017

(65) Prior Publication Data
US 2019/0149773 A1    May 16, 2019

(30) Foreign Application Priority Data

May 25, 2016   (JP) .................................. 2016-104723

(51) Int. Cl.
*H04N 7/18* (2006.01)
*H04N 5/77* (2006.01)
*H04N 7/035* (2006.01)

(52) U.S. Cl.
CPC .............. *H04N 7/181* (2013.01); *H04N 5/77* (2013.01); *H04N 7/035* (2013.01); *H04N 7/18* (2013.01)

(58) Field of Classification Search
CPC .......... H04N 7/181; H04N 5/77; H04N 7/035; H04N 7/18
See application file for complete search history.

(56) References Cited

U.S. PATENT DOCUMENTS

| 6,157,675 A | 12/2000 | Mitsuhashi et al. |
| 2002/0049979 A1* | 4/2002 | White ............... H04N 21/2187 725/87 |

(Continued)

FOREIGN PATENT DOCUMENTS

| CN | 101795264 A | 8/2010 |
| CN | 101843099 A | 9/2010 |

(Continued)

OTHER PUBLICATIONS

International Search Report Issued in Patent Application No. PCT/JP2017/008399 dated May 16, 2017.

(Continued)

*Primary Examiner* — Thai Q Tran
*Assistant Examiner* — Sunghyoun Park
(74) *Attorney, Agent, or Firm* — Pearne & Gordon LLP

(57) ABSTRACT

A moving image splitting device is connected to the cameras of a camera group that captures moving images, connected to an information processor through a network, and having a processor. The processor repeats requesting the camera to send a moving image, acquiring a captured moving image from the camera, detecting an I frame from the acquired moving image, creating split data with a sequence allocated in an ascending order of captured time instants in a GOP unit including the I frame, and accumulating the split data in a storage device. In response to a request for split data from the information processor, the processor extracts split data from the storage device with reference to the sequence allocated to the split data, and transfers the extracted split data to the information processor.

11 Claims, 8 Drawing Sheets

(56) References Cited

U.S. PATENT DOCUMENTS

| | | | |
|---|---|---|---|
| 2003/0231863 A1 | 12/2003 | Eerenberg et al. | |
| 2004/0105494 A1 | 6/2004 | Aikawa et al. | |
| 2005/0157794 A1* | 7/2005 | Kim | H04N 19/63 375/240.16 |
| 2005/0234892 A1 | 10/2005 | Tamura | |
| 2006/0050697 A1* | 3/2006 | Li | H04L 29/06027 370/389 |
| 2007/0106419 A1 | 5/2007 | Rachamadugu | |
| 2007/0126889 A1* | 6/2007 | Kim | H04N 5/262 348/231.2 |
| 2008/0063362 A1 | 3/2008 | Grigorian | |
| 2008/0160911 A1* | 7/2008 | Chou | H04N 21/2221 455/7 |
| 2008/0222527 A1* | 9/2008 | Kang | G11B 27/105 715/723 |
| 2009/0037970 A1* | 2/2009 | Chen | H04N 7/17318 725/116 |
| 2009/0096893 A1 | 4/2009 | Naito et al. | |
| 2011/0273563 A1 | 11/2011 | Murphy et al. | |
| 2011/0296046 A1* | 12/2011 | Arya | H04L 65/602 709/231 |
| 2013/0114670 A1 | 5/2013 | Chen et al. | |
| 2013/0251274 A1 | 9/2013 | Xie et al. | |
| 2014/0085480 A1* | 3/2014 | Saptharishi | G06F 16/71 348/159 |
| 2015/0281691 A1 | 10/2015 | Takehara et al. | |
| 2015/0326866 A1 | 11/2015 | Ikai et al. | |
| 2015/0373075 A1 | 12/2015 | Perlman et al. | |
| 2017/0078376 A1* | 3/2017 | Coward | H04L 67/1008 |

FOREIGN PATENT DOCUMENTS

| | | |
|---|---|---|
| CN | 103379363 A | 10/2013 |
| CN | 103763637 A | 4/2014 |
| CN | 104539985 A | 4/2015 |
| CN | 105472323 A | 4/2016 |
| JP | H10-336670 A | 12/1998 |
| JP | 2002-077882 A | 3/2002 |
| JP | 2003-284009 A | 10/2003 |
| JP | 2003-309847 A | 10/2003 |
| JP | 2010-171659 A | 8/2010 |
| JP | 2012-147107 A | 8/2012 |
| JP | 2013-051534 A | 3/2013 |
| JP | 2015-195474 A | 11/2015 |
| RU | 2 549 584 C2 | 4/2015 |
| RU | 2 556 882 C1 | 7/2015 |
| WO | 2008-022305 A2 | 2/2008 |
| WO | 2014-103529 A1 | 7/2014 |

OTHER PUBLICATIONS

Written Opinion Issued in Patent Application No. PCT/JP2017/008399 dated May 16, 2017.
Russian Notice of Allowance—Decision on Grant of a Patent for Invention issued in Patent No. RU 2018140695 dated Mar. 28, 2019.
Chinese Office Action issued in Patent Application No. CN-201780028873.8 dated Apr. 1, 2019.
Extended European Search Report issued in Patent Application No. EP 17 802 392 dated Apr. 8, 2019.

* cited by examiner

US 10,681,314 B2

MOVING IMAGE SPLITTING DEVICE AND MONITORING METHOD

TECHNICAL FIELD

The present disclosure relates to a monitoring method using a monitor camera system that transfers captured moving images to a server to accumulate the moving images for prevention of crimes or for management, for example, and a moving image splitting device suitable for transferring moving images from a monitor camera.

BACKGROUND ART

Conventionally, for the purpose of preventing crimes, survey, or management, a camera system is introduced in which points to be monitor targets including the entrances of buildings, such as multi family dwellings, or shops, streets, factories, or distribution centers, for example, are timely monitored using monitor cameras, and the monitored result is sent to the monitor of a user terminal through the Internet and other electrical communication lines for monitoring. A camera system is also developed in which still images are captured, the acquired images are compressed at a server, and then the images are displayed on a terminal (e.g. see JP 2013-51534 A). However, generally, a system that records moving images captured at a camera is more known (e.g. see JP 2002-77882 A). Some methods of coding and decoding moving image images are known (e.g. see WO 2014/103529 A).

SUMMARY OF INVENTION

A moving image splitting device according to an aspect of the present disclosure is a moving image splitting device connected to cameras of a camera group that captures moving images and connected to an information processor through a network, the moving image splitting device including a processor, wherein the processor requests the camera to send a moving image and acquires a captured moving image from the camera, the processor repeats detecting an I frame from the acquired moving image, creating split data with a sequence allocated in order of captured time in a GOP unit including an I frame, and accumulating the created split data on a storage device, in response to a request for split data from the information processor, the processor extracts split data from the storage device with reference to the sequence allocated to the split data, and the processor transfers the extracted split data to the information processor.

DESCRIPTION OF EMBODIMENTS

Figure 1:
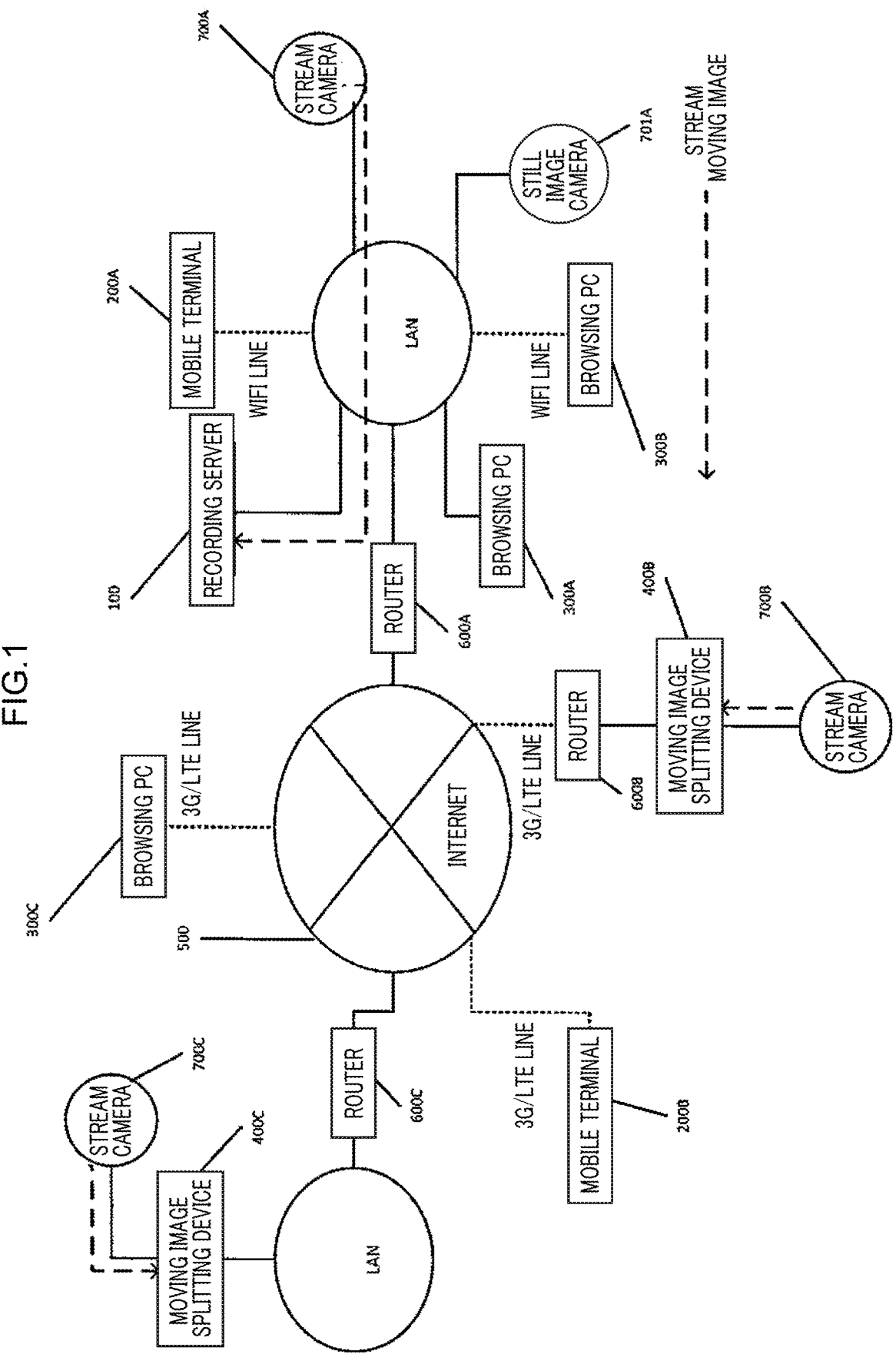
FIG. 1 is a diagram showing an exemplary configuration of a monitor camera system in a monitoring method according to an embodiment.

In conventional systems, images can be compressed at a server. However, the systems have a problem that moving image transfer from a monitor camera to a server is vulnerable to the deterioration of line status and this is specifically noticeable in the case of moving images.

In order to prevent the deterioration of resolution of pictures due to the deterioration of line status from the monitor camera to the server, the interval of capturing has to be increased to decrease the number of frames to be transferred, or resolution has to be dropped for capturing.

Because of these problems, monitor camera pictures are not stably gathered in cloud environments where moving images are not easily handled.

EMBODIMENTS

A first object of an embodiment that will be described below is to provide a monitoring method using a monitor camera system that solves the above-described problems and enables stable gathering of monitor camera pictures in cloud environments and a moving image splitting device used for the same.

A moving image splitting device according to a first aspect of the embodiment is a moving image splitting device connected to cameras of a camera group that captures moving images, connected to a recording server through a router and the Internet, and having an accumulation folder in which data is saved. The moving image splitting device has:

a moving image acquiring means that requests the camera to send a moving image, and acquires a captured moving image from the camera as a moving image in a baseline profile by streaming;

a split data creating means that repeats detecting an I frame from the acquired moving image, creating split data with serial numbers allocated in order of captured time in a GOP unit where the I frame is a beginning image, and accumulating the data in the accumulation folder;

a latest split data extracting means that extracts latest split data from the accumulation folder every time when receiving a request for the latest split data from the recording server;

a latest split data transferring means that transfers the extracted latest split data to the recording server; and a complementary split data transferring means that transfers split data one by one as the complementary split data from the accumulation folder to the recording server every time when receiving a complementary picture request from the recording server. The Group Of Picture (GOP) is a frame group formed of one or more I frames and a plurality of P frames or a plurality of B frames.

According to the first aspect of the embodiment, in transfer of picture data from the camera group to the recording server, the picture data is split in units with a small capacity in which original pictures can be reconstructed later, and the picture data can be transmitted while busy time of the network is avoided. Thus, stable gathering of monitor camera pictures in cloud environments is enabled.

Note that the term "image" includes meanings of both of a still image and a moving image image. However, in the present disclosure, the still image is expressed as "image", and the moving image image is expressed as "picture" for distinguishing between the images.

A monitoring method using a monitor camera system according to a second aspect of the embodiment is a monitoring method using a monitor camera system having a camera group that captures moving images, a moving image splitting device connected to cameras of the camera group and having an accumulation folder in which data is saved, and a recording server connected to the moving image splitting device through a router and the Internet. The method includes:

a moving image acquiring step in which the moving image splitting device requests the camera to send a moving image and acquires a captured moving image from the camera as a moving image in a baseline profile by streaming;

a split data creating step in which the moving image splitting device repeats detecting an I frame from the acquired moving image, creating split data with serial numbers allocated in order of captured time in a GOP unit where the I frame is a beginning image, and accumulating the created split data in the accumulation folder;

a scheduled-time-gathering requesting step in which the recording server requests the moving image splitting device to send latest split data at every predetermined time;

a latest split data extracting step in which every time when receiving a request for latest split data from the recording server, the moving image splitting device extracts the latest split data from the accumulation folder;

a latest split data transferring step in which the moving image splitting device transfers the extracted latest split data to the recording server;

a complementary split data gathering requesting step in which the recording server repeatedly requests the moving image splitting device to send the complementary split data;

a complementary split data transferring step in which every time when receiving a complementary split data request from the recording server, the moving image splitting device transfers the split data one by one as the complementary split data from the accumulation folder to the recording server at the timing other than the timing of the latest split data transferring step;

an image saving step in which every time when receiving the latest split data or the complementary split data, the recording server extracts an I frame, and saves the I frame as primary image data; and a picture saving step in which the recording server joins the latest split data to the complementary split data for each of primary picture data generating unit times, and saves the joined data as primary picture data.

According to the second aspect of the embodiment, in transfer of picture data from the camera group to the recording server, the picture data is split in units with a small capacity in which original pictures can be reconstructed later, and the picture data can be transmitted while busy time of the network is avoided. The images that can be confirmed in still images immediately after transmitted to the recording server as well as the pictures that can be confirmed on moving images of high image quality can be created, and hence stable gathering of monitor camera pictures in cloud environments is enabled.

A monitoring method according to a third aspect of the embodiment includes: a deleting step in which every lapse of the primary picture data generating unit time, the recording server requests the moving image splitting device to delete split data in the accumulation folder; and a deleting step in which in response to a delete request for split data from the recording server, the moving image splitting device deletes the split data from the accumulation folder. The moving image splitting device possesses a small capacity. Consequently, the moving image splitting device is of excellent compactness, and a cost reduction is enabled.

In a monitoring method according to a fourth aspect of the embodiment, in the complementary split data transferring step, when fast and last split data of generating unit of a primary picture data are present in split data remaining in the accumulation folder, the beginning split data and the last split data are set to complementary split data in priority, and subsequently, on the allocated serial numbers, split data with a captured time instant closer to the present time instant is set to complementary split data in priority in split data with serial numbers closest to a median in a group of the highest continuity. Time for fixing picture skips (drop frames or frame omission) that occur with a loss of data because complementary data gathering fails can be reduced.

In the present disclosure, the term "network" includes networks configured of communication networks, such as local area networks (LANs), the Internet, Wireless-Fidelity (Wi-Fi) lines, third generation (3G)/long-term evolution (LTE) lines, and leased lines, and combinations of these lines. The cameras have an output function and a moving image capturing function. The camera is preferably an Internet Protocol (IP) camera. However, the camera is also enabled by an analog camera. In the aspect, the camera does not have to be connected to the recording server via the LAN network. Even the moving image monitor camera connected to the Internet through the 3G/LTE line can transfers data that is reconstructed to replay a moving image of high resolution to the recording server, and the range in which moving image monitor cameras can be placed is widened.

According to the embodiment, stable gathering of monitor camera pictures in cloud environments is enabled.

In the following, the embodiment will be described more in detail using an embodiment, which is non-limiting.

First Embodiment

A monitoring method according to a first working example is a monitoring method using a monitor camera system in which a monitor camera is activated by a recording server through a network, the recording server that is an example of an information processor captures, gathers, edits, and saves camera images, such as moving images or still images, and the recording server transmits images to be monitored through the network to a user terminal in response to a request from the terminal. Among others, the method according to the first working example is a monitoring method using a monitor camera system provided with a moving image capturing camera that is connected to the recording server through the Internet; the camera is not on a LAN network to which the recording server belongs. A moving image splitting device of the first working example for use in the monitoring method according to the first working example will be described as well.

The monitor camera system can transmit images or pictures reconstructed at the recording server to a terminal, for example, can replay, rewind, and fast forward live images, and can replay libraries as well. The monitor camera system can compress and save the reconstructed images, can transmit the images to a terminal, for example, and can replay, rewind, and fast forward past images. In the embodiment, the moving images captured at the camera are split and transferred from the moving image splitting device to the recording server in accordance with the Transmission Control Protocol/Internet Protocol (TCP/IP). Thus, data can be gathered at the maximum even in environments in which the line between the moving image splitting device and the recording server is unstable, and moving image gathering is enabled using a cloud server, for example, without installing a recording server at a local site. Data transmission resistant to the deterioration of line status is enabled while reconstruction of pictures of high image quality is enabled, compared with simple moving image gathering. With the order of transmission after the moving image splitting device splits a moving image, the transmission timing, and processing at the recording server, the delay of picture transmission to the recording server is prevented, live images of high image quality can be replayed, rewound, and fast forwarded even in moving image gathering at the recording server, and moving images that can be replayed, rewound, and fast forwarded in high image quality can also be saved. Note that the term "library replay" here means replay after a live image is rewound to the past or means the fast forward replay of images in the past.

(Configuration)

FIG. 1 is a diagram showing an exemplary configuration of the monitor camera system in accordance with the monitoring method according to the embodiment. On a network 500 composed of a combination of communication networks, such as LANs, the Internet, Wi-Fi lines, 3G/LTE lines, and leased lines, the following is connected: (1) a plurality of monitor cameras (moving image cameras) 700A to 700C and a plurality of monitor cameras (still image cameras) 701A as cameras that capture images; (2) moving image splitting devices 400B and 400C respectively connected to the monitor cameras (moving image cameras) 700B and 700C, and the devices 400B and 400C acquire pictures captured at the monitor cameras, and transfer the pictures to a recording server 100; (3) the recording server 100 as a recording server that is connected to the monitor cameras (still image cameras) 701 or the monitor cameras (moving image cameras) 700 through the network 500 for acquiring and accumulating image data or picture data captured at the cameras and transmitting the data to a terminal; and (4) mobile terminals 200A and 200B, such as smartphones, and browsing personal computers (PC) 300A to 300C, such as desktop personal computers (PCs) or notebook PCs, as terminals that are connected to the recording server 100 through the network 500 and receive and display image data from the recording server 100. In FIG. 1, the flows of moving images (stream moving images) captured at the monitor cameras (moving image cameras) are depicted by dotted arrows. Note that in the following, the mobile terminals and the browsing PCs are collectively referred to as "terminals" or "Viewers".

The recording server 100 is connected to the monitor cameras (moving image cameras) 700B and 700C through the network 500 including the Internet. In the monitor camera system of the embodiment, the monitor cameras (still image cameras) that capture still images as well as the monitor cameras (moving image cameras) that capture moving images are also provided on networks other than the LAN to which the recording server 100 belongs. The embodiment is the monitoring method using the monitor camera system including the monitor cameras (moving image cameras) on the networks other than the LAN to which the recording server belongs. The monitor cameras (still image cameras) and the monitor cameras (moving image cameras) on the LAN network to which the recording server belongs may not be provided. The browsing terminal may be provided only on the LAN network to which the recording server belongs, may be only a terminal connected to the recording server through the Internet, or the recording server also serves as the browsing terminal. The recording server 100 is connected to the monitor camera (moving image camera) 700B through the moving image splitting device 400B, a router 600B, the Internet, a router 600A, and the LAN network. The server 100 is connected to the monitor camera (moving image camera) 700C through the moving image splitting device 400C, a router 600C, the Internet, the router 600A, and the LAN network. The server 100 acquires image data on the monitor cameras (moving image cameras) 700B and 700C from the moving image splitting devices 400B and 400C. To the Internet network connected to the LAN to which the recording server 100 is connected through the router 600A, the 3G/LTE lines are connected, and another LAN is connected through the router 600C. The moving image splitting device 400B is connected to the Internet network through the router 600B and the 3G/LTE line. The moving image splitting device 400C is connected to the Internet network through the router 600C and the LAN network. The moving image splitting device 400C is connected the LAN to which the recording server 100 does not belong. FIG. 1 shows a non-limiting exemplary connection in which the monitor cameras (moving image cameras) and the monitor cameras (still image cameras) or the browsing PCs or the mobile terminals are connected to the recording server through a plurality of networks. In the embodiment, communications between the monitor cameras (still image cameras) 701 and the recording server 100 and communications between the monitor cameras (moving image cameras) 700 and the recording server 100 are performed in accordance with the Transport Control Protocol (TCP) with high reliability in which a session is established and then communications are started. However, communications may be performed by the User Datagram Protocol (UDP) that is fast and has excellent real time performance in which data is transmitted without establishing any session. Images can be acquired in accordance with both of the TCP and the UDP.

In the embodiment, the monitor cameras (moving image cameras) and the monitor cameras (still image cameras) are IP cameras, but the cameras may be analog cameras. However, in the case of analog cameras, a converter is necessary. The browsing PC 300 that is an image display terminal is not limited to the case in which the PC 300 is present in the LAN to which the recording server 100 belongs. The PC 300 may be connected through a plurality of networks, such as the Internet, LANs, and Wi-Fi lines. The mobile terminal 200 that is an image display terminal may be connected through a plurality of networks, such as LANs, the Internet, and mobile telephone networks (Wi-Fi lines, 3G/LTE lines, and any other lines), for example. Note that the router 600 is present between the LAN and the Internet and between the monitor cameras (moving image cameras) and the monitor cameras (still image cameras) and the Internet.

One recording server 100 can acquire camera moving images from a plurality of monitor cameras (moving image cameras) 700, and can acquire camera still images from a plurality of monitor cameras (still image cameras) 701. In the embodiment, since the recording server 100 side automatically distributes network traffic, network design is unnecessary, and the cameras only have to connect to ports, which makes work very simple. In the case in which communications are interrupted, restart is easy.

To the recording server 100, the monitor camera (moving image camera) 700A and the monitor camera (still image camera) 701A are also connected through the LAN. However, the monitoring method according to the embodiment targets the monitor cameras (moving image cameras) alone, and does not target cameras connected to the recording server 100 on the LAN. Thus, cameras described below do not include monitor cameras (still image cameras) (illustrated as the monitor camera (still image camera) 701A in FIG. 1) and monitor cameras (moving image cameras) (illustrated as the monitor camera (moving image camera) 700A in FIG. 1) connected to the recording server 100 on the LAN.

In the conventional IP camera system, pictures are highly likely to be coarse when line status deteriorates unless otherwise a monitor camera that acquires moving images is placed on the LAN to which the recording server belongs. However, since the embodiment enables stable gathering of monitor camera pictures in cloud environments, moving image monitor cameras can be provided also on the Internet and the 3G/LTE lines for portable terminals, for example, and hence the degree of freedom is significantly improved.

Figure 2:
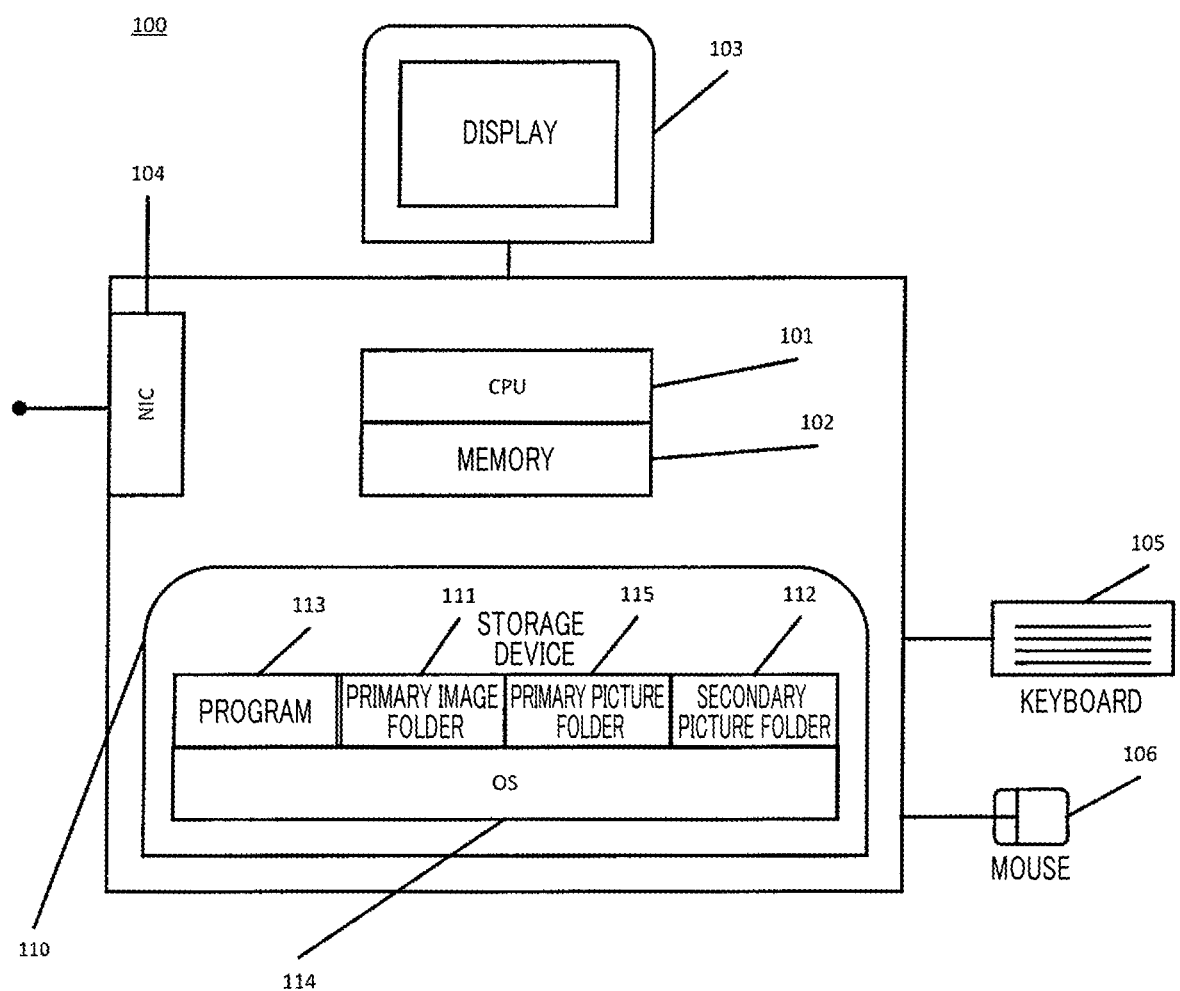
FIG. 2 is a block diagram of a recording server of a monitor camera system in a first working example of the monitoring method according to the embodiment.

FIG. 2 is a block diagram of the recording server of the monitor camera system according to the first working example of the monitoring method of the embodiment. The recording server 100 is an example of an information processor equipped with: a control arithmetic logic unit having a central processing unit (CPU) 101 with a memory 102 that is a cache memory, device drivers, and any other device; a storage device 110 having a main storage device, such as a DRAM, and an auxiliary storage device, such as a hard disk; and an input-output device composed of a communication controller, such as a network interface 104, a display 103 that is a display device, a keyboard 105, a mouse 106, and any other device. On the storage device 110, a primary image folder 111, a primary picture folder 115, a secondary picture folder 112, a program 113, an authentication database, and an environmental configuration folder, for example, as well as an operating system 114 are stored. The program 113 is generally stored on the auxiliary storage device of the storage device 110, and loaded to main storage device in execution. In the primary image folder 111, the still image of an I frame extracted from split data acquired from the moving image splitting device 400 is accumulated as primary image data. In the primary picture folder 115, a moving image created by joining split data acquired from the moving image splitting device 400 in the order of serial numbers that are an exemplary sequence is accumulated as primary picture data. In the secondary picture folder 112, primary picture data in a certain time period accumulated in the primary picture folder 111 is compressed and converted into a moving image and the moving image is accumulated as secondary picture data. The program 113 includes various programs, such as a gathering and editing program and a transmission program. In the authentication database, IDs, passwords, the port numbers and IP addresses of the monitor cameras 700 and 701, the mobile terminals 200, and the browsing PCs 300 are accumulated, and unique identifications (UIDs) are accumulated for terminals with no IP addresses. In the embodiment, the recording server 100 possesses the recording server and the terminal that are integrally formed. In order to serve as a function of an image display terminal, and perform maintenance and management, the server 100 has the display 103, and the keyboard 105 and the mouse 106 that are input units. In the case in which the replay of camera images is unnecessary in the recording server, the terminal function as a display device may not be provided. In the environmental configuration folder, the timing of acquiring pictures from the moving image splitting devices, the creation intervals of primary image data and primary picture data and secondary picture data, compression conditions, and any other parameter are accumulated. Although the recording server 100 is a cloud server, the server 100 may be an installed server.

The recording server 100 requests the monitor cameras (moving image cameras) 700B and 700C connected through the Internet to establish connection through the moving image splitting devices 400B and 400C, respectively. The moving image splitting devices 400B and 400C request the monitor cameras (moving image cameras) 700B and 700C to capture moving images, the moving image splitting devices 400B and 400C acquire moving images from the monitor cameras (moving image cameras) 700B and 700C, and the moving image splitting devices 400B and 400C split the moving images. The recording server requests the moving image splitting devices 400B and 400C to send the split data of the moving images, and the recording server 100 requests the moving image splitting devices 400B and 400C to transmit the split data that can be reconstructed later to the recording server 100.

The recording server 100 achieves the functions of a computer that enables processes from image acquisition from the moving image splitting device to editing and saving images in the monitoring method according to the embodiment by loading the gathering and editing program to the memory 102 and executing the program by the CPU 101. The recording server 100 achieves the functions of a computer that enables image sending processing to the terminal by loading the transmission program to the memory 102 and executing the program by the CPU 101. The CPU 101 is an arithmetic processing device installed on a typical computer. The CPU 101 executes various programs, and performs various kinds of control, for example.

The recording server 100 is one server, or may be a server group composed of a plurality of recording servers. For example, for the secondary picture folder, secondary picture data after a lapse of a certain period (e.g. 24 hours) may be saved on a secondary picture folder provided on another recording server different from the recording server that acquires camera images. The data saved in the past that is not frequently replayed is separated, and hence this enables monitoring of a larger number of cameras on the same network.

The gathering and editing program is a program that causes a computer to achieve: (1) a moving image splitting device connecting function that connects the moving image splitting device; (2) a latest split data acquiring function that causes the connected moving image splitting device to input latest split data to the recording server for every certain time period (e.g. three seconds); (3) a complementary split data acquiring function that causes the moving image splitting device to input complementary split data to the recording server; (4) an I frame extracting function that extracts an I frame from the split data acquired from the moving image splitting device; (5) an I frame memory expanding function that expands the extracted I frame on the memory; (6) a primary image data saving function that saves the extracted I frame as primary image data in a primary image data folder; (7) a primary picture data saving function that joins the split data acquired from the moving image splitting device for each of primary picture data generating unit times (e.g. ten minutes) and saves the joined data as primary picture data in the primary picture data folder; (8) a lapse-of-primary-picture-data-generating-unit-time determining function that determines whether the primary picture data generating unit time is elapsed; (9) a complement necessity determining function that determines whether omission is present in the serial numbers of the acquired split data; and (10) a split data delete requesting function that causes the moving image splitting device to delete a predetermined piece of split data.

In the embodiment, the gathering and editing program, as a more preferable aspect, is a program that also causes a computer to achieve a secondary picture data creating function that joins primary picture data for every certain time period (e.g. ten minutes) and converts the primary picture data into secondary picture data compressed in a moving image format with a time stamp. All pieces of the primary image data are complete images (I frames (intra-coded frames)). The primary picture data is moving image data composed of I frames and P frames (predictive inter frames) in which acquired split data is arranged and joined in the capturing order (i.e., the order of serial numbers). In the secondary picture data, primary picture data is compressed in the moving image format with no change. For example, an I frame is present per 200 frames, and a P frame (predictive inter frame) as well as a B frame (bidirectional predictive inter frame) may be inserted in combination, which reduces the capacity with no degradation. In the embodiment, since reference can be made to a forward I frame, the B frame can be inserted. Since the B frame is the difference between the current frame and the preceding and following frames, the B frame is smaller than the P frame.

The transmission program is a program that also causes a computer to achieve: a terminal connecting function that connects the terminal; an image selection accepting function that displays a camera list on the terminal and accepts a selection of a camera; a live image transmitting function that transmits the image of primary data of the selected camera as a live image to the terminal; a live image rewind accepting function that accepts a request to rewind the live image from the terminal; a rewound live image transmitting function that extracts primary data at a point in time by a certain time period (e.g. one second) in the past from the image previously transmitted to the terminal for each rewind request and transmits the extracted data as a rewound live image to the terminal; a rewound live image fast forward accepting function that accepts a request for the fast forwarded rewound live image from the terminal; and a fast forwarded live image transmitting function that extracts primary data at a point in time by a certain time period (e.g. one second) in the future from the image previously transmitted to the terminal for each fast forward request until the image at the present point in time is reached and transmits the data as a fast forwarded live image to the terminal. The term "image at the present point in time" means the newest I frame in the I frames extracted from the split data acquired from the moving image splitting device. Consequently, the image at the present point in time is changed to a new image every time when split data from the moving image splitting device is inputted to the recording server.

The transmission program is a program that also causes a computer to achieve: a library image accepting function that accepts a request for a library image from a rewound live image from the terminal; and a library image transmitting function that extracts primary image data at a point in future time from the image previously transmitted to the terminal by a certain time period, i.e. by an interval for acquiring latest split data from the moving image splitting device 400 to the recording server 100 for every library image request and transmits the data as a fast forwarded live image to the terminal. Note that "the library image" stated here means a fast forward replay image of a past image.

In the case in which the terminal makes a picture replay request after secondary picture data is created, the transmission program is a program that causes a computer to achieve a secondary picture transmitting function that extracts secondary picture data instead of primary image data and transmits pictures to the terminal in response to a request, such as a replay request, a rewind request, and a fast forward request, from the terminal.

In the embodiment, the connection between the terminals 200 and 300 and the recording server 100 is also performed in accordance with the TCP/IP method in which authentication is made using a user ID and a password, the terminal is confirmed that the terminal is registered on the recording server, and then the images are transmitted. Authentication is preferably authentication by an authentication database on the recording server.

When the recording server is connected to the network through the router even though the terminal is not on the LAN to which the recording server belongs, an image (a full image or a compressed image) is acquired from the recording server using the IP address of the connected router and the port number allocated to the router. For the connection of the terminal, the terminal is authenticated using the UID registered in terminal authentication.

Since the recording server 100 identifies the terminal based on terminal unique information using the UID in stating connection of the mobile terminal 200, the server 100 enables image display in accordance with authentication of the user ID and the password and the matching of terminal unique information.

Figure 3:
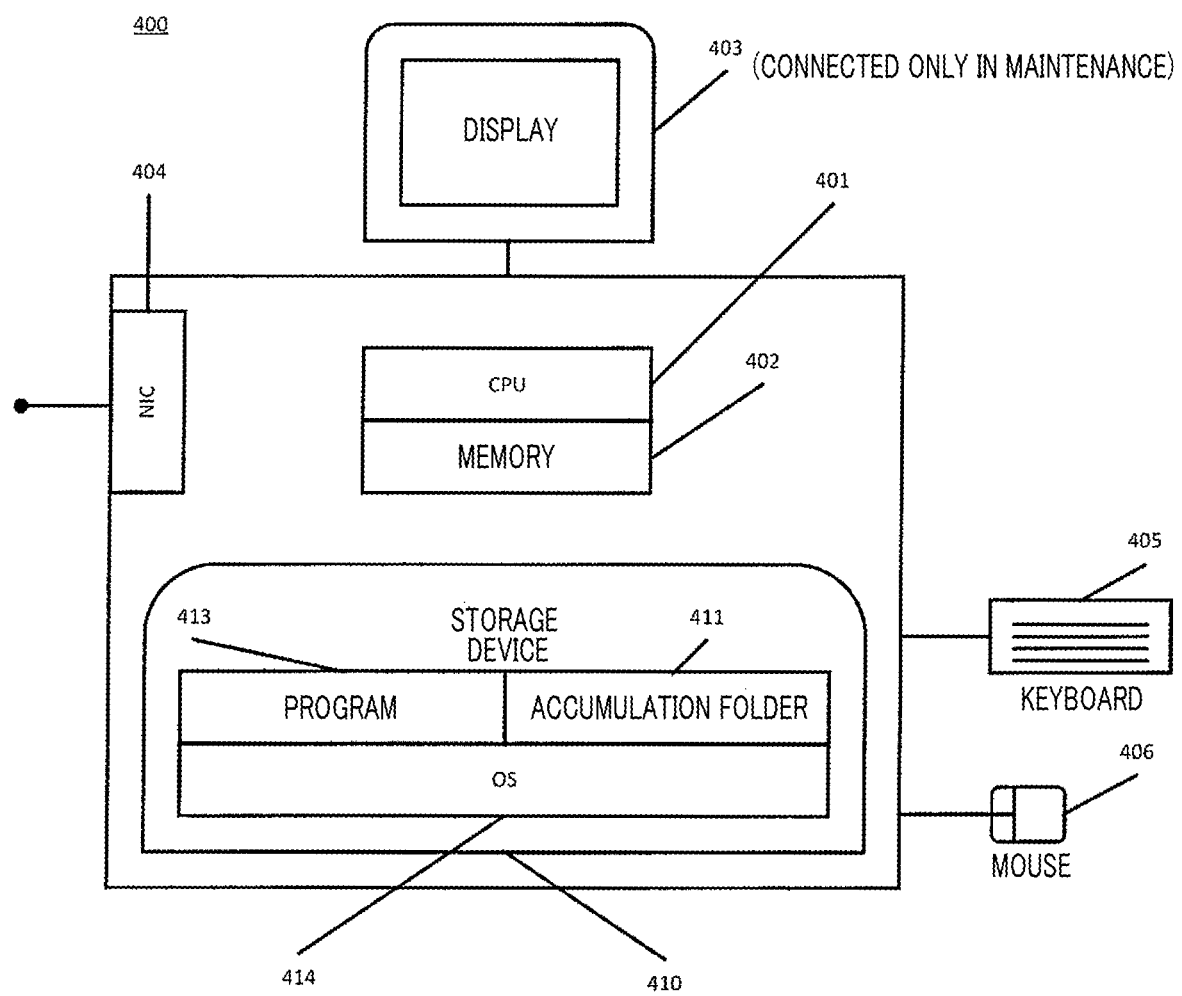
FIG. 3 is a block diagram of a first working example of a moving image splitting device according to the embodiment.

FIG. 3 is a block diagram of the first working example of the moving image splitting device according to the embodiment. The moving image splitting device 400 is equipped with: a control arithmetic logic device having a CPU 401 with a memory 402, device drivers, and any other device; a storage device 410 having a main storage device, such as a DRAM, and an auxiliary storage device, such as a hard disk; a communication controller, such as a network interface 404; a display 403 that is a display device for use in connection only for maintenance; and an input-output device composed of a keyboard 405, a mouse 406, and any other device. On the storage device 410, an accumulation folder 411, an environmental configuration folder, a moving image splitting program 413, and an operating system 414 are stored. The accumulation folder 411 is a folder in which images are saved. In the accumulation folder 411, split data is accumulated in which split data is acquired from the monitor camera (moving image camera), the data is split such that the split length is a GOP unit (e.g. one second) and an I frame is the beginning image, and serial numbers are allocated to the split data in order of captured time. In the environmental configuration folder, conditions for determining whether an I frame appears, conditions for length, and other conditions are accumulated. The serial number is allocated such that serial numbers are continued in ascending order of captured time instants. For example, the format may be serial numbers of 00001, 00002, and 00003, or may be a format of 0201153059, 0201153100, and 0201153101 based on captured dates and time and split length.

The moving image splitting device 400 is connected to the monitor cameras (moving image cameras) 700 connected to the recording server 100 through the Internet in one to one.

In the embodiment, the recording server 100 controls a connection request from the moving image splitting device 400 to the monitor camera (moving image camera) 700 to which the moving image splitting device 400 is connected. The moving image splitting device 400 acquires camera pictures from the monitor camera (moving image camera) 700, splits the camera pictures into a predetermined piece of split data, and transmits latest split data to the recording server 100 at predetermined intervals while transmitting complementary split data to the recording server 100.

The moving image splitting device 400 achieves the functions of a computer that enables the acquisition, editing, and saving of camera images and transmission of the images to the recording server in the monitoring method according to the embodiment by loading the moving image splitting program 413 to the memory 402 and executing the program 413 by the CPU 401. The CPU 401 is an arithmetic processing device installed on a typical computer, and the CPU 401 executes various programs, and performs various kinds of control, for example.

The moving image splitting program 413 is a program that causes a computer to achieve: (1) a camera connecting function that establishes connection to the monitor camera (moving image camera) after connection is established to the recording server; (2) a moving image acquiring function that requests the connected monitor camera (moving image camera) to send a moving image and acquires a captured moving image from the monitor camera (moving image camera) as a moving image in a baseline profile by streaming; (3) a split data creating function that repeats detecting an I frame from the acquired moving image, creating split data with serial numbers allocated in order of captured time in a GOP unit including the I frame (e.g. a GOP unit where the I frame is a beginning image), and accumulating the data in the accumulation folder; (4) a latest split data extracting function that extracts the latest split data from the accumulation folder every time when a request for latest split data is received from the recording server; (5) a latest split data transferring function that transfers the extracted latest split data to the recording server; and (6) a complementary split data transferring function that transfers the split data one by one as the complementary split data from the accumulation folder to every time when a complementary picture request is received from the recording server the recording server.

In the embodiment, the gathering and editing program, as a more preferable aspect, is a program that causes a computer to also achieve a complementary split data creating function in which on complementary split data, when fast and last split data of generating unit of a primary picture data are present in split data remaining in the accumulation folder, the beginning split data and the last split data are set to complementary split data in priority, and subsequently, on the allocated serial numbers, split data with a captured time instant closer to the present time instant is set to complementary split data in priority in split data with serial numbers closest to a median in a group of the highest continuity.

In the embodiment, the connection between the monitor camera and the moving image splitting device is established in accordance with the TCP/IP method, and in order to identify the monitor camera, authentication is performed through the moving image splitting device using the user ID and the password set by the recording server side, and then a request, such as camera image capturing, is performed. Authentication is preferably authentication conducted by the authentication database on the recording server through the moving image splitting device.

The moving image splitting devices 400B and 400C in the monitoring method according to the embodiment are not present on the LAN to which the recording server belongs, and are connected via the network through the router. Thus, moving images are acquired from the moving image splitting device based on the IP address of the connected router and the port number allocated to the router. When the moving image splitting devices are connected in an environment with no global IP, moving image transfer is performed from the moving image splitting device to the recording server. In this transfer, the port number of the recording server side router is opened, and the port is transferred to the recording server. The moving image splitting devices 400B and 400C are connected to the monitor cameras (moving image cameras) 700B and 700C via on the LAN to which belong the cameras 700B and 700C via the network. The devices 400B and 400C acquire, split, and accumulate moving images regardless of requests from the recording server.

In the case of the monitor camera on the local environment (e.g. on the LAN to which the server 100 belongs), the recording server 100 can identify the camera at the other end of connection by connection using the IP address and the port number in stating connection for authentication with the user ID and the password. However, in connection to a monitor camera in a remote environment through the Internet network, for example, a camera at the other end of connection is identified with the global IP address and the port number using router port transfer (also referred to as port forwarding, for example).

Figure 4:
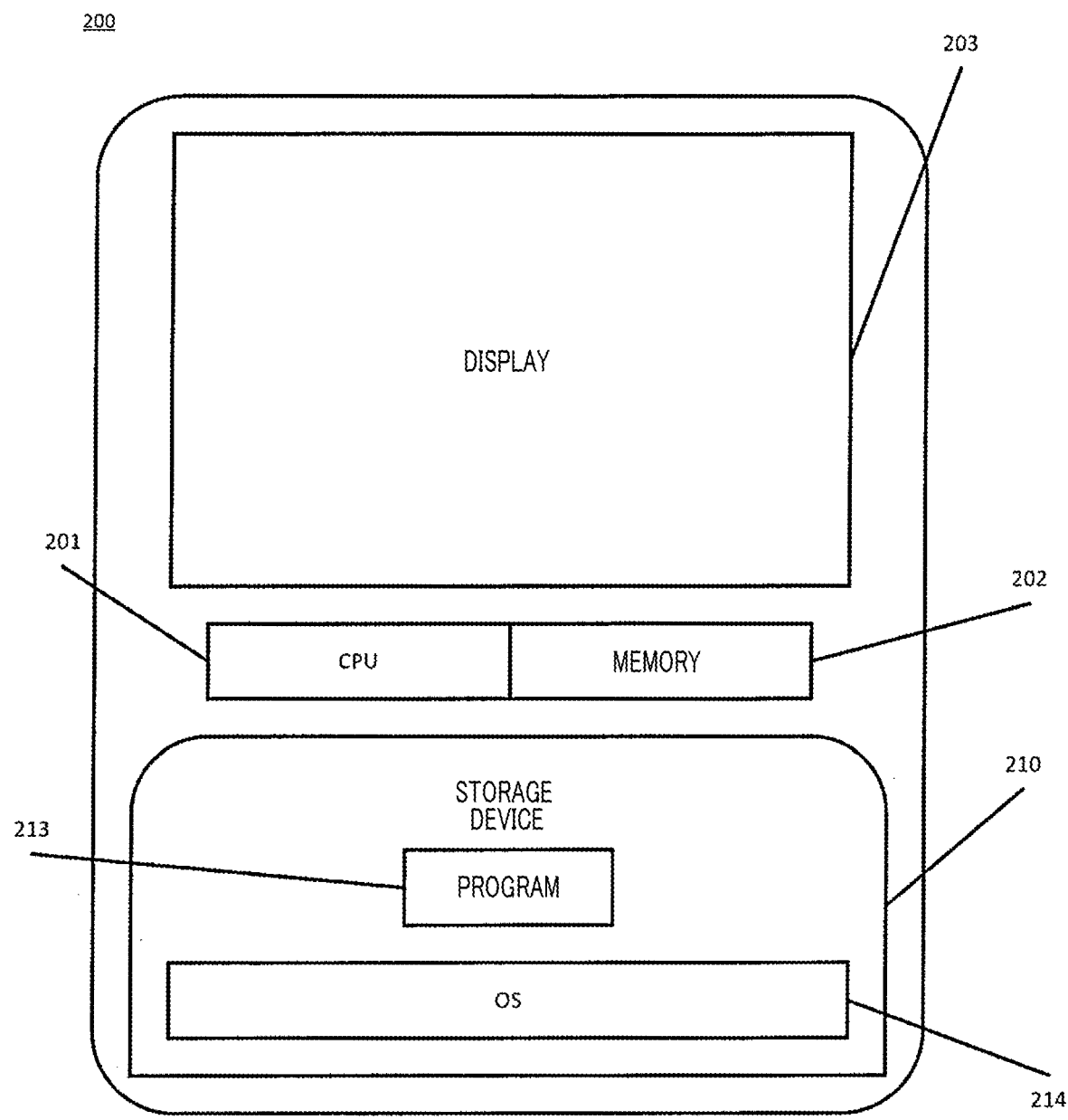
FIG. 4 is a block diagram of a terminal (mobile terminal) of the monitor camera system in the first working example of the monitoring method according to the embodiment.

FIG. 4 is a block diagram of the terminal (mobile terminal) of the monitor camera system in the first working example of the monitoring method according to the embodiment. The mobile terminal 200 is equipped with: a control arithmetic logic device having a CPU 201 with a memory 202, device drivers, and any other device; a storage device 210; a communication controller that performs data transmission and reception, for example; a display 203 that is a display device; and an input-output device, such as a manipulation button or a touch panel. On the storage device 210, an image display program 213 and an operating system 214 are stored. For example, the mobile terminal 200 is a mobile telephone, such as a smartphone. The terminal 200 achieves the functions of a computer that enables image display in the monitoring method according to the embodiment by loading the image display program 213 to the memory 202 and executing the program 213 by the CPU 201. The CPU 201 is an arithmetic processing device installed on a typical mobile terminal, and the CPU 201 executes various programs, and performs various kinds of control, for example.

Figure 5:
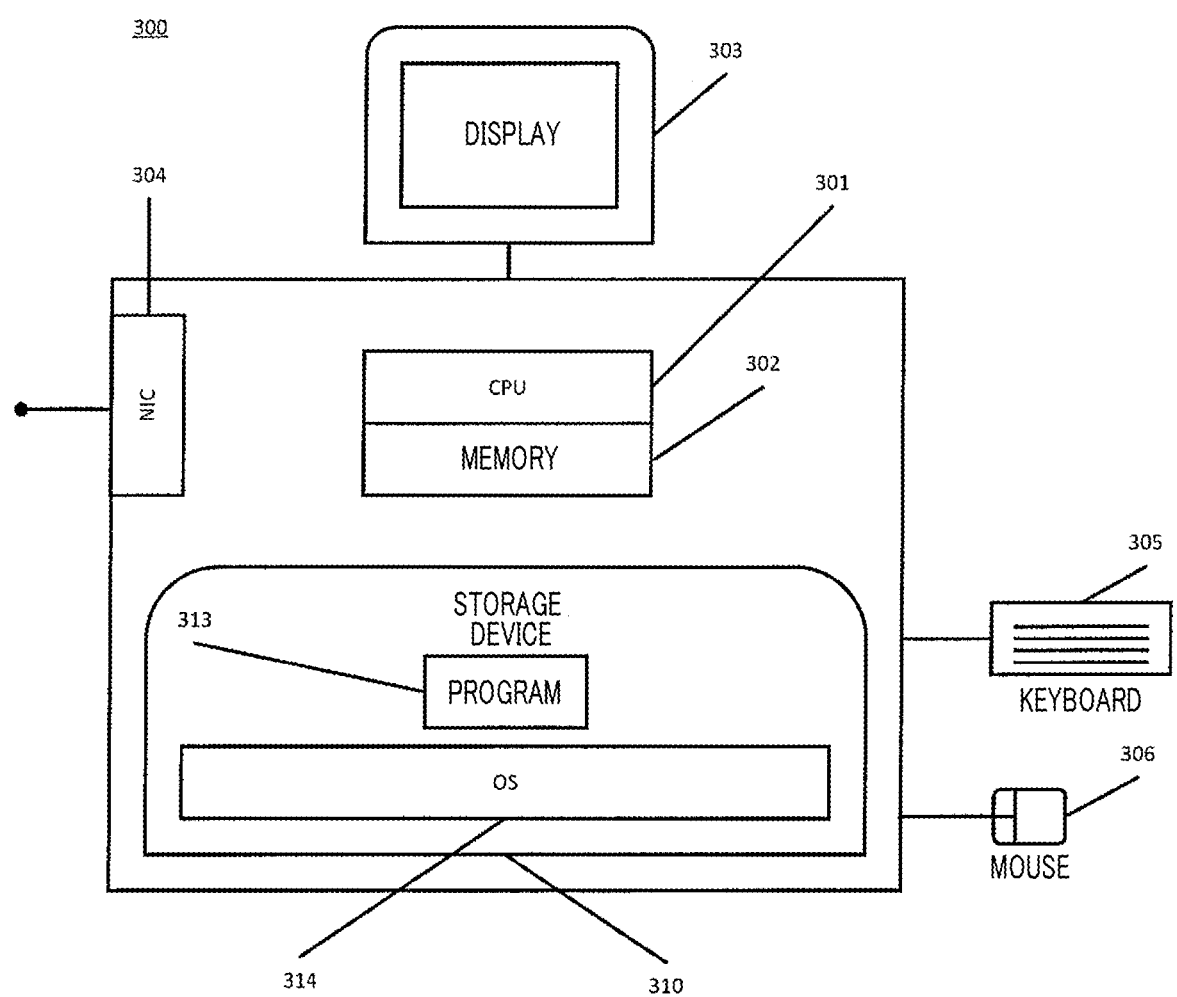
FIG. 5 is a block diagram of a terminal (personal computer (PC)) of the monitor camera system in the first working example of the monitoring method according to the embodiment.

FIG. 5 is a block diagram of the terminal (PC) of the monitor camera system of the first working example of the monitoring method according to the embodiment. The browsing PC 300 is equipped with: a control arithmetic logic device having a CPU 301 with a memory 302, device drivers, and any other device; a storage device 310 having a main storage device, such as a DRAM, and an auxiliary storage device, such as a hard disk; a communication controller, such as a network interface 304; a display 303 that is a display device; and an input-output device composed of a keyboard 305, a mouse 306, and any other device. On the storage device 310, an image display program 313 and an operating system 314 are stored. The browsing PC 300 is a desktop PC, a notebook PC, a tablet terminal, and any other device, for example. The browsing PC 300 achieves the functions of a computer that enables image display in the monitoring method according to the embodiment by loading the image display program 313 on the memory 302 and executing the program 313 by the CPU 301. The CPU 301 is an arithmetic processing device installed on a typical PC, and the CPU 301 executes various programs, and performs various kinds of control, for example.

The image display program is a program that causes a computer to achieve a terminal connecting function that establishes connection to the recording server, and an image display function that displays images transmitted from the recording server.

The image display program, as a more preferable aspect, is a program that also causes a computer to achieve: a live image requesting function that requests the recording server to send live images at every camera image acquisition interval from the monitor camera to the recording server during live image display; a rewind start requesting function that accepts an input of a rewind request during live image display and requests the recording server to send a rewound live image; a rewind continuation requesting function that requests recording server for a rewound live image in every certain time period (e.g. 0.2 seconds) shorter than the request interval of live images during rewound live image display; a rewound live image fast forward start requesting function that accepts an input of a fast forward request from a user during rewound live image display and requests the recording server to send a fast forwarded live image; and a rewound live image fast forward continuation requesting function that requests the recording server to send a fast forwarded live image in every certain time period (e.g. 0.2 seconds) shorter than the request interval of live images during fast forwarded live image display.

In the embodiment, the image display program, as a more preferable aspect, is a program that also causes a computer to achieve: a library image start requesting function that accepts an input of a library image request during rewound live image display and requests the recording server to send a library image; and a library image continuation requesting function that requests the recording server to send a library image at every camera image acquisition interval from the camera to the recording server during library image display. The term "library image" stated here means a replayed image after a live image is rewound to the past or means the fast forward replay image of a past image.

In the embodiment, the recording server 100, the browsing PC 300, and the moving image splitting device 400 are all configured as a personal computer, and are equipped with a clock function and any other function that a typical personal computer has. The mobile terminal 200 is also equipped with a clock function and any other function.

In the monitoring method according to the embodiment, the moving image splitting device 400 of the first working example is a moving image splitting device connected to the cameras (the monitor cameras (moving image cameras) 700B and 700C) of the camera group that captures moving images, connected to the recording server 100 through the network 500 including the router 600 and the Internet, and having the accumulation folder 411 in which data is saved. The device 400 is provided with: (1) a moving image acquiring means that requests the connected monitor camera (moving image camera) 700 to send a moving image and acquires a captured moving image from the monitor camera (moving image camera) 700 as a moving image in a baseline profile by streaming; (2) a split data creating means that repeats detecting an I frame from the acquired moving image, creating split data with serial numbers allocated in order of captured time in a GOP unit including the I frame (e.g. a GOP unit where the I frame is a beginning image), and accumulating the split data in the accumulation folder 411; (3) a latest split data extracting means that extracts latest split data from the accumulation folder 411 every time when receiving a request for the latest split data from the recording server 100; (4) a latest split data transferring means that transfers the extracted latest split data to the recording server 100; and (5) a complementary split data transferring means that transfers split data one by one as complementary split data from the accumulation folder 411 to the recording server 100 every time when receiving a complementary picture request from the recording server 100. In the embodiment, the device 400 is also provided with: (6) a complementary split data creating means in which when fast and last split data of generating unit of a primary picture data are present in split data remaining in the accumulation folder 411, the beginning split data and the last split data are set to complementary split data in priority, and subsequently, on the allocated serial numbers, split data with a captured time instant closer to the present time instant is set to complementary split data in priority in split data with serial numbers closest to a median in a group having the highest continuity.

The moving image splitting device 400 functions as the means (1) to (6) by the above-described hardware configuration and the moving image splitting program 413.

In the monitoring method according to the embodiment, the recording server 100 is provided with: (1) a moving image splitting device connecting means that establishes connection to the moving image splitting device; (2) a latest split data acquiring means that causes the connected moving image splitting device to input latest split data to the recording server for every certain time period (e.g. three seconds); (3) a complementary split data acquiring means that causes the moving image splitting device to input complementary split data to the recording server; (4) an I frame extracting means that extracts an I frame from the split data acquired from the moving image splitting device; (5) an I frame the memory expanding means that expands the extracted I frame on the memory; (6) a primary image data saving means that saves the extracted I frame as primary image data in the primary image data folder; (7) a primary picture data saving means that joins the split data acquired from the moving image splitting device for each of primary picture data generating unit times (e.g. ten minutes) and saves the joined data as primary picture data in the primary picture data folder; (8) a lapse-of-primary-picture-data-generating-unit-time determining means that determines whether the primary picture data generating unit time is elapsed; (9) a complement necessity determining means that determines whether omission is present in the serial numbers of the split data acquired; and (10) a split data delete requesting means that causes the moving image splitting device to delete a predetermined piece of split data. The server 100 is further provided with: (11) a secondary picture data creating means that joins primary picture data for every certain time period (e.g. ten minutes) and converts the primary picture data into secondary picture data compressed in a moving image format with a time stamp.

The recording server 100 functions as the means (1) to (11) by the above-described hardware configuration and the gathering and editing program. The recording server 100 functions as an image transmitting means that transmits live images and library images to the terminal and transmits rewound or fast forwarded images, for example, of these images by the above-described hardware configuration and the transmission program. The term "library image" stated here means the replayed image after a live image is rewound to the past or means the fast forward replay of images of the past images.

The terminals 200 and 300 are provided with: (1) a terminal connecting means that establishes connection to the recording server 100; and (2) an image display means that displays images transmitted from the recording server 100. The terminals function as the means (1) to (2) by the above-described hardware configuration and the image display programs 213 and 313. In detail, the image display means further includes: (2-1) a live replay requesting means that requests the recording server 100 to perform the live replay of camera moving images of one or a plurality of monitor cameras 700 and 701 with monitoring authorization; (2-2) a live replay display means that displays primary image data transmitted from the recording server 100; (2-3) a past picture replay requesting means that requests the recording server 100 to perform the replay of past camera moving images of one or a plurality of monitor cameras 700 and 701 with monitoring authorization; and (2-4) a past picture replay display means that displays primary picture data or secondary picture data transmitted from the recording server 100.

Note that since secondary picture data created by compressing camera image data is converted into secondary picture data at the recording server in every certain time period, the terminal enables the replay, rewind, and fast forward of past camera images, which conventional recording and reproducing devices enable, other than the rewind of live images or the fast forward of the images after rewinding. Since primary data compressed for primary saving is used for rewound live composite images and fast forwarded live composite images with small data volumes while the composite images are of high image quality, these composite images possess a small data volume while being of high image quality. When past images are replayed, fast forwarded, or rewound in a secondary data creating unit or more, which is not frequently used, secondary picture data that is a compressed and converted moving image file is used, and hence the data volume necessary for saving is small although the data is a moving image. The replay of live composite images after the images are rewound is enabled.

The monitor camera system composed of the monitor camera, the moving image splitting device, the recording server, and the terminal described above is a monitor camera system that achieves the monitoring method according to the first working example. With control of transfer of data to be transmitted from the moving image splitting device to the recording server, a problem, such as data delay, is not prone to occur even on a moving image capturing camera installed at a site other than a local environment. The moving images captured at the camera are split and transferred to the recording server. Thus, data can be gathered at the maximum even in environments in which the line between the moving image splitting device and the recording server is unstable, and moving image gathering is enabled using a cloud server, for example, without installing a recording server at a local site. That is, stable gathering of monitor camera pictures in cloud environments is enabled. A monitoring system that enables data transmission resistant to the deterioration of line status can be achieved while the system is of high resolution and high image quality. With control of transfer of data simultaneously flowing on the network, camera images can be flowed to the recording server via general Internet lines, for example, and network camera information can be flowed to general Internet lines, for example. Consequently, moving image data accumulation from the monitor camera via using a cloud server over the Internet line (wide area network (WAN) is enabled. The delay of picture transmission of the recording server is prevented, live images of high image quality can be replayed, rewound, and fast forwarded even in moving image gathering at the recording server, and moving images that can be replayed, rewound, and fast forwarded in high image quality can also be saved. According to the monitor camera system described above, in streaming picture recording, the elimination of the phenomenon in which pictures are unclear or frames are omitted in simple connection like connection on a LAN when line status deteriorates, which is the degradation of pictures and a loss of frames, can be achieved, although the camera is connected to the recording server through the Internet, by stably recording moving image data using a device near a camera under no influence of the line, splitting the moving image data, and sending the data to the recording server under control of transfer.

(Procedures)

In the following, the monitoring procedures of the first working example of the monitoring method using the monitor camera system according to the embodiment will be described. In the procedures, the monitor camera system described above is used. The system is composed of the monitor camera (moving image camera), the moving image splitting device, the recording server connected to the monitor camera (moving image camera) through the Internet, and the terminal.

Figure 6:
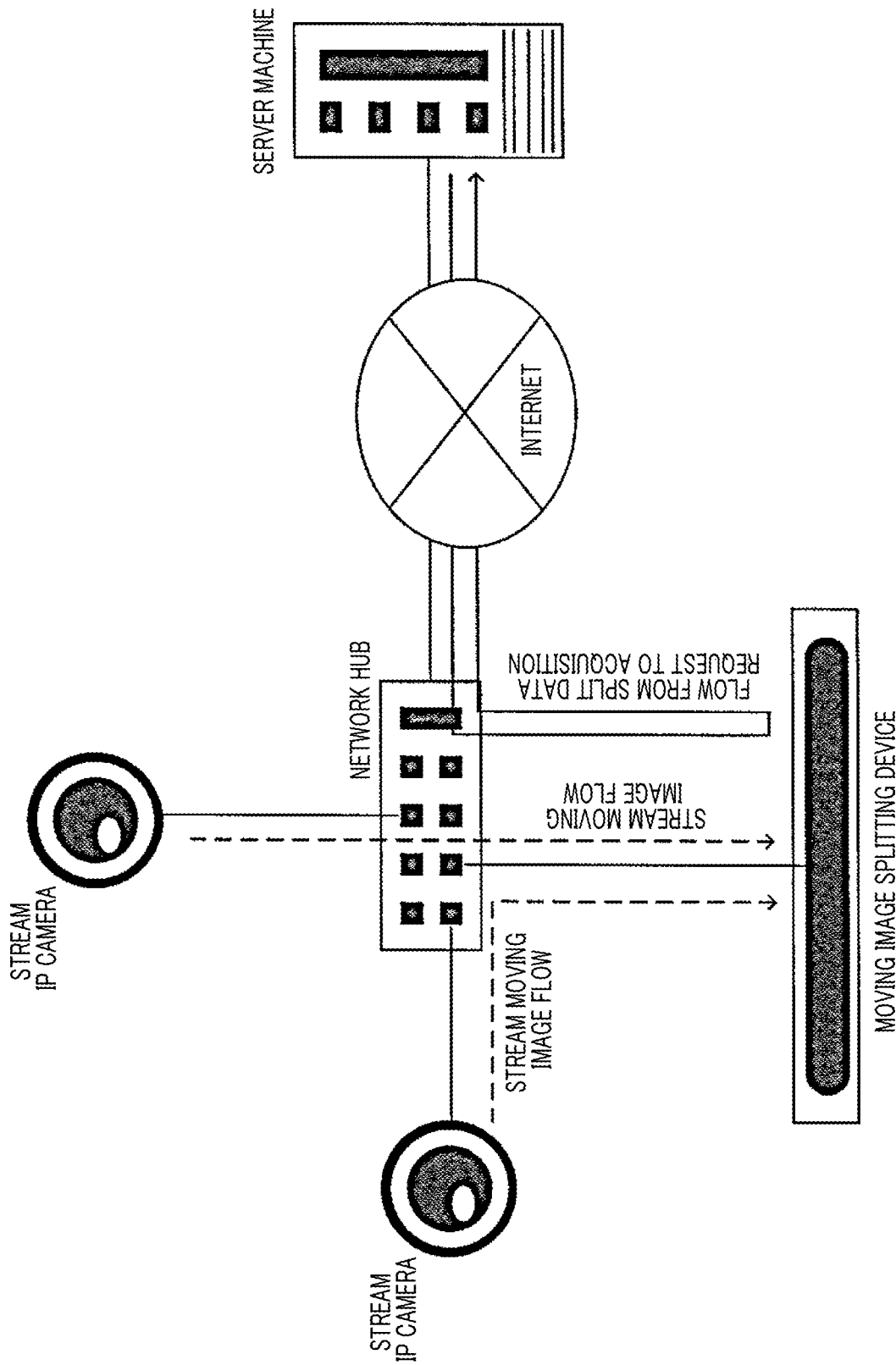
FIG. 6 is an image diagram of data transmission from a monitor camera (moving image camera) to a recording server in the first working example of the monitoring method according to the embodiment.

FIG. 6 is an image diagram of data transmission from the monitor camera (moving image camera) to the recording server of the first working example of the monitoring method according to the embodiment. A stream IP camera that is the monitor camera (moving image camera) is connected to the moving image splitting device through a network HUB. The moving image splitting device is connected to an Internet network through the network HUB. A server machine that is the recording server is connected to the Internet network.

From the recording server to the moving image splitting device, a request for split data is transmitted. Upon receiving a connection request from the recording server, the moving image splitting device establishes connection to the monitor camera (moving image camera) and requests a moving image. The monitor camera (moving image camera) transmits a stream moving image to the moving image splitting device based on the request from the moving image splitting device. The stream moving image transmitted to the moving image splitting device is edited to split data that is split in GOP units at the moving image splitting device, and the split data is transmitted to the recording server in accordance with TCP/IP.

The stream data (real time streaming protocol (RTSP)) is a protocol very vulnerable to situations like situations in which transfer capacity is changed or cut off depending on line status, and the stream data possesses a problem that exchanging data though lines, such as 3G/LTE lines, other than a LAN, causes unstable moving image acquisition. When lines are busy, frames are considerably few, or pictures are coarse. When line status deteriorates to cut off communications, it takes very long time to establish reconnection. However, according to the first working example of the monitoring method of the embodiment, data can be gathered at the maximum even in environments in which the line between the moving image splitting device and the recording server is unstable, and hence data transmission resistant to the deterioration of line status is enabled. In the case in which line status is stable, the first working example of the monitoring method according to the embodiment enables the generation of moving images at the same level as that of conventional methods with which stream moving images are transmitted with no change. However, in the case in which line status deteriorates and data transmission rate is changed from 300 kbps (kilobit per second) to 37.5 kbps, for example, the conventional methods with which stream moving images are transmitted with no change try to maintain the number of frames, thus pictures are highly likely to be coarse. Suppose that the transmission rate at 300 kbps is fully used, image quality is one-eighth. In terms of resolution, pictures have to be pictures with the Video Graphics Array (VGA) (640×480 dots) size blown up from the VGA (160×120 dots) size. However, in the first working example of the monitoring method according to the embodiment, pictures possess skips, which are pictures per eight seconds, putting it simply. In the first working example of the monitoring method according to the embodiment, when line status is improved, a complementing process functions, and a skip of eight seconds is likely to be complemented. Note that since the LAN is present between the camera and the moving image splitting device, pictures flowing between the camera and the moving image splitting device are independent from the situations of the lines between the recording server and the moving image splitting device. In the conventional method with which stream moving images are transmitted with no change, even though line status deteriorates and then is improved, pictures remain rough because no complementing process is performed. In the conventional method with which stream moving images are transmitted with no change, in the case in which line status further deteriorates and communications are cut, communications are not easily restored. In the LAN, communications are likely to be reconnected in relatively early time (about one minute). However, in lines, such as 3G/LTE lines, other than the LAN, communications are highly unlikely to be restored. This is because consideration is paid only to connection of LANs to the recording server to be connected in many cases. Even though the number of retries is increased more or less, when communication cut-off occurs in the midway point of connection, incomplete communications are recognized and no acknowledgment from the camera is found in some cases. On the other hand, in the first working example of the monitoring method according to the embodiment, communications are intermittent in which data is split and transferred in the first place, and hence pictures are not affected even under communication cut-off. When the duration of communication cut-off is prolonged, frames are omitted. However, since the complementing function is available, frames are likely to be filled later. With awareness of complement, a problem is not prone to occur when the transmission rate is set based on 256 kbps under the maximum transmission rate of 300 kbps even though line status deteriorates.

Figure 7:
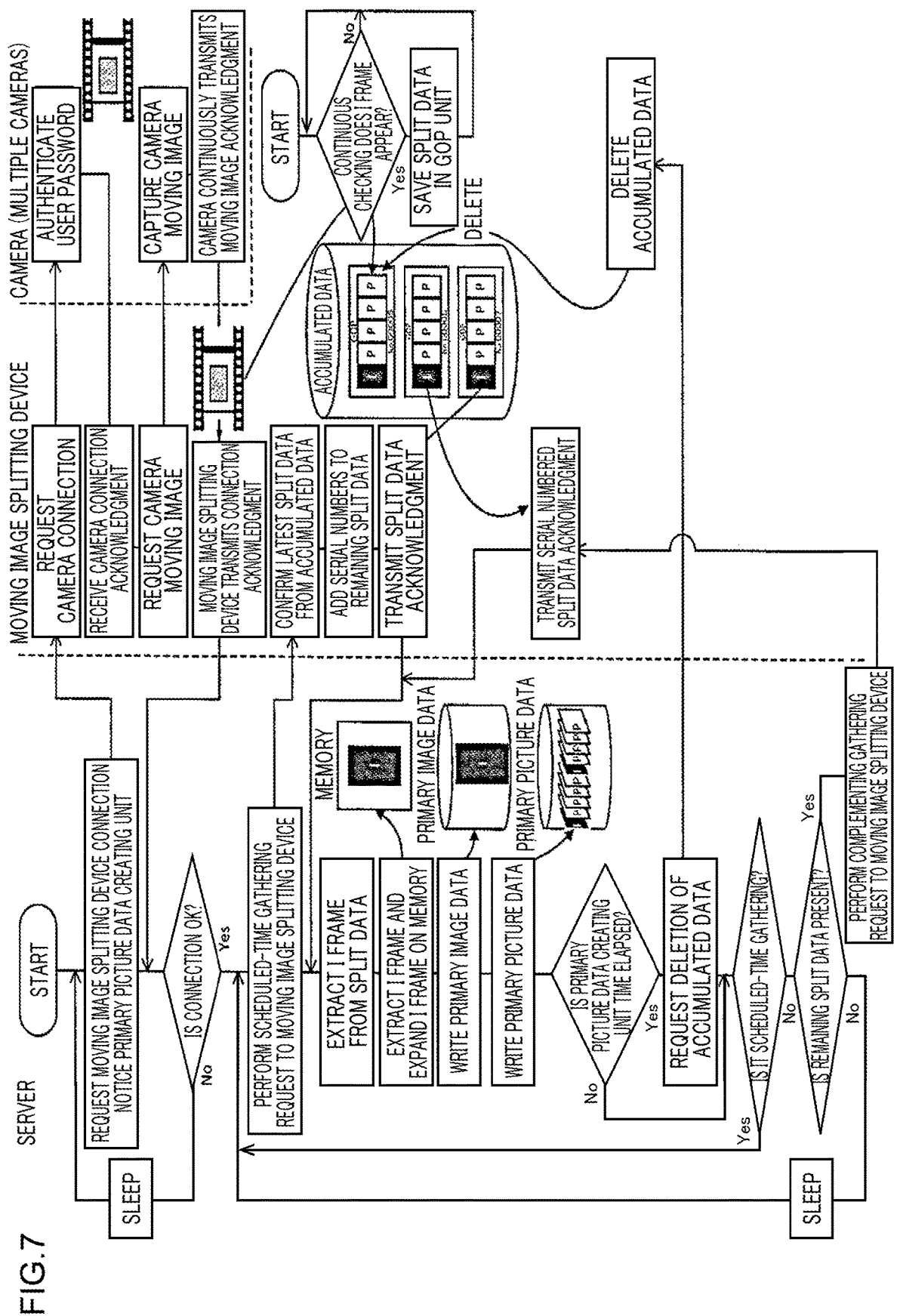
FIG. 7 is a flowchart of schematic procedures from connection between a camera and the recording server to writing primary picture data in the first working example of the monitoring method according to the embodiment.

FIG. 7 is a flowchart of schematic procedures from connection of the camera to the recording server to writing primary picture data in the first working example of the monitoring method according to the embodiment.

The monitoring method according to the embodiment is a monitoring method using a monitor camera system having a camera group that captures moving images, a moving image splitting device connected to cameras (monitor cameras (moving image cameras)) of a camera group and having an accumulation folder in which data is saved, and a recording server connected to the moving image splitting device through a router and the Internet. The method includes: (1) a moving image acquiring step in which the moving image splitting device requests the monitor camera (moving image camera) to send a moving image and acquires a captured moving image from the monitor camera (moving image camera) as a moving image in a baseline profile by streaming; (2) a split data creating step in which the moving image splitting device repeats detecting an I frame from the acquired moving image, creating split data with serial numbers allocated in order of captured time in a GOP unit including the I frame (e.g. a GOP unit where the I frame is a beginning image), and accumulating the data in the accumulation folder; (3) a scheduled-time-gathering requesting step in which the recording server requests the moving image splitting device to send the latest split data at every predetermined time; (4) a latest split data extracting step in which the moving image splitting device extracts latest split data from the accumulation folder every time when a request for the latest split data is received from the recording server; (5) a latest split data transferring step in which the moving image splitting device transfers the extracted latest split data to the recording server; (6) a complementary split data gathering requesting step in which the recording server repeatedly requests the moving image splitting device to send the complementary split data; (7) a complementary split data transferring step in which the moving image splitting device transfers the split data one by one as the complementary split data from the accumulation folder to the recording server every time when receiving a request for complementary split data from the recording server at the timing other than the timing of the latest split data transferring step; (8) an image saving step in which the recording server extracts an I frame and saves the I frame as primary image data every time when receiving the latest split data or the complementary split data; and (9) a picture saving step in which the recording server joins the latest split data to the complementary split data for each of primary picture data generating unit times and saves the data as primary picture data. In the embodiment, the method also includes: (10) a deleting step in which the recording server requests the moving image splitting device to delete split data in the accumulation folder every lapse of the primary picture data generating unit time. The method further includes a deleting step in which the moving image splitting device deletes split data from the accumulation folder in response to the delete request for the split data from the recording server. In the embodiment, in the complementary split data transferring step described above, when fast and last split data of generating unit of a primary picture data are present in split data remaining in the accumulation folder, the moving image splitting device sets the beginning split data and the last split data to complementary split data in priority, and subsequently, on the allocated serial numbers, the moving image splitting device sets split data with a captured time instant closer to the present time instant to complementary split data in priority in split data with serial numbers closest to a median in a group of the highest continuity.

The program of the monitor camera system having the gathering and editing program and the moving image splitting program causes a computer to execute these steps.

(Step 1)

Figure 8:
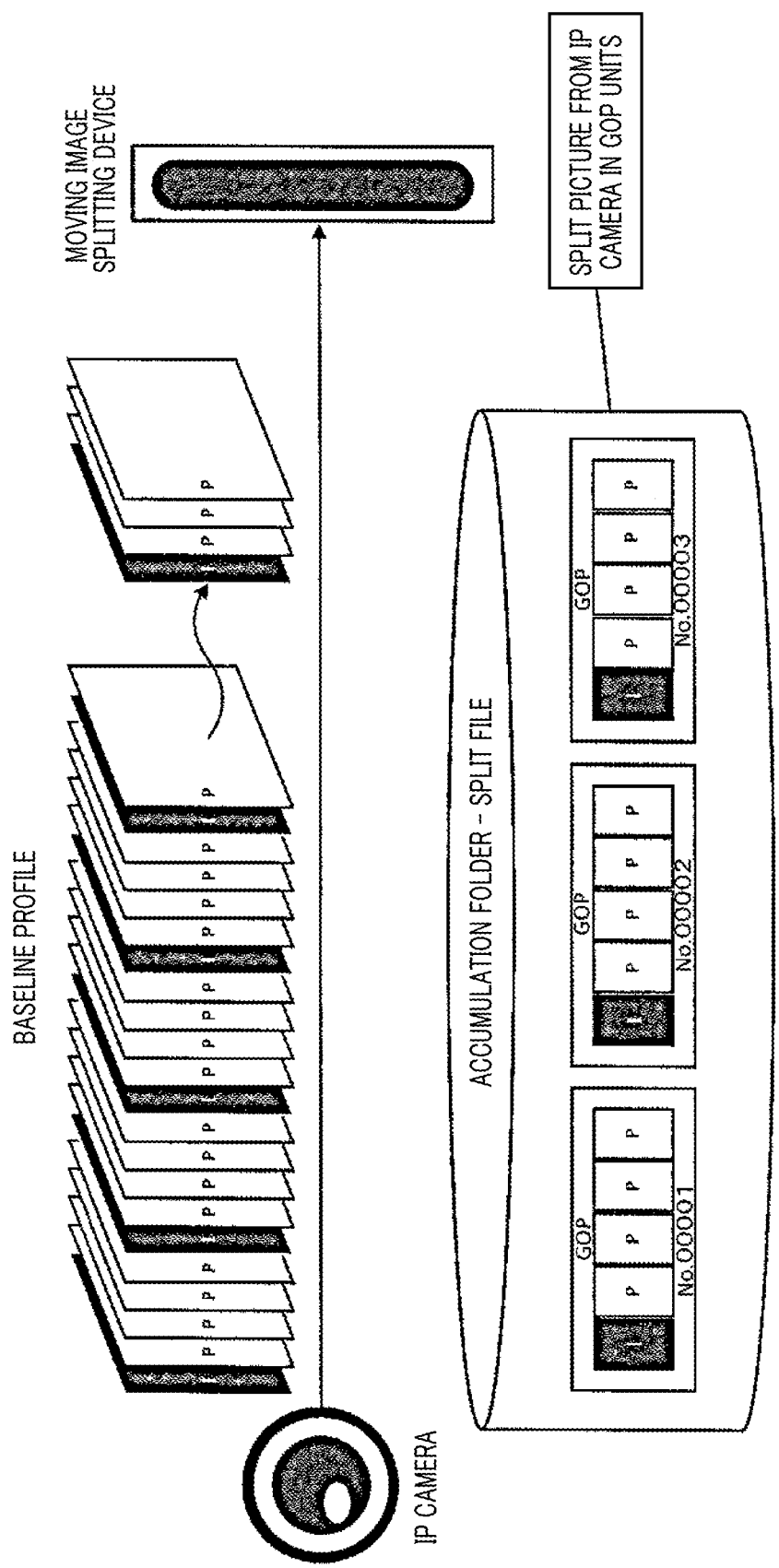
FIG. 8 is an illustration of a moving image transmission method from a camera to a moving image splitting device and a split data saving method in a first working example of a monitoring method using a monitor camera system according to the embodiment.

FIG. 8 is an illustration of a moving image transmission method from the camera to the moving image splitting device and a split data saving method in the first working example of the monitoring method using the monitor camera system according to the embodiment. Upon receiving a moving image request, the monitor camera (moving image camera) continuously captures a moving image, and transmits the captured and obtained moving image by streaming as a moving image that is camera pictures in accordance with H.264 baseline profile to the moving image splitting device. Upon receiving the moving image from the monitor camera (moving image camera) by streaming, the moving image splitting device transmits a connection acknowledgment to the recording server. After authentication is successfully achieved with reference to the authentication database of the recording server, the recording server is in connection with the monitor camera (moving image camera) through the moving image splitting device. When establishing connection fails, the process returns to Step S.

(Step 2)

The moving image splitting device detects an I frame from the moving image acquired from the monitor camera (moving image camera), creates split data with serial numbers allocated in order of captured time in a GOP unit where the I frame is a beginning image, and accumulates the data in the accumulation folder. The moving image splitting device repeats this process during the reception of moving images from the monitor camera (moving image camera). In the embodiment, upon detecting an I frame, the moving image splitting device forms a piece of split data from the I frame to a frame immediately before the subsequent detected I frame. In the embodiment, a GOP unit is one second, which is non-limiting. In the embodiment, a moving image is a moving image including one I frame in one second. However, the moving image splitting device sets for which every second an I frame is contained, and the moving image splitting device instructs the monitor camera (moving image camera) in requesting a moving image. In the embodiment, a piece of split data is formed of one I frame and one or a plurality of P frames, for example. In the embodiment, a piece of split data contains one I frame. However, a piece of split data may include a predetermined number of I frames that are at least two, which is non-limiting. Upon detecting a predetermined number of I frames, the moving image splitting device forms a piece of split data from the I frame to a frame immediately before the subsequent detected I frame. However, this increases data volumes to be transmitted to the Internet network, and also increases loads of processing at the recording server. Thus, the moving image splitting device preferably creates a piece of split data every time when detecting an I frame. In this case, the split data includes only a beginning I frame.

(Step 3)

Subsequently, the recording server makes a scheduled-time gathering request that requests the moving image splitting device to send the latest split data in every predetermined time period (e.g. three seconds). Upon receiving the request for the latest split data, the moving image splitting device extracts the latest split data, i.e. split data with the largest serial number in the accumulation data folder, and transmits the data to the recording server. For example, when three pieces of split data with serial numbers 00005, 00006, and 00007 are present in the accumulation data folder, the moving image splitting device transmits the split data with serial number 00007 that is the latest split data to the recording server in scheduled-time gathering. As described above, the moving image splitting device extracts the latest split data from the storage device 410 with reference to the serial numbers that is an exemplary sequence allocated to split data.

(Step 4)

Upon acquiring the split data from the moving image splitting device, the recording server extracts an I frame from the split data, expands the extracted I frame on the memory, and saves the extracted I frame as primary image data in the primary image folder. The recording server joins the acquired split data for each of primary picture data generating unit times (e.g. ten minutes), and saves the joined data as primary picture data in the primary picture data folder. The recording server determines whether the primary picture data generating unit time is elapsed. In the case in which the primary picture data generating unit time is not elapsed, the process goes to Step 5, whereas in the case in which the primary picture data generating unit time is elapsed, the process goes to Step 8.

(Step 5)

In the case in which the primary picture data generating unit time is not elapsed, the recording server then determines whether omission is present in the serial numbers of the acquired split data. In the case in which omission is present in the serial numbers, the process goes to Step 6, whereas in the case in which no omission is present in the serial numbers, the process goes to Step 8.

(Step 6)

In the case in which omission is present in the serial numbers, the recording server requests the moving image splitting device to send complementary split data. The moving image splitting device transfers the split data one by one as the complementary split data from the accumulation folder to the recording server at the timing other than the timing of transferring the latest split data to the recording server every time when receiving a request for complementary split data from the recording server, and the process returns to Step 4. On complementary split data, when fast and last split data in generating unit of a primary picture data are present in split data remaining in the accumulation folder, the moving image splitting device sets the beginning split data and the last split data to complementary split data in priority, and subsequently, on the allocated serial numbers, the moving image splitting device sets split data with a captured time instant closer to the present time instant to complementary split data in priority in split data with serial numbers closest to a median in a group of the highest continuity. That is, in gathering complementary split data, the recording server puts a serial number in places with long intervals. For example, when five pieces of split data with serial numbers 00001, 00002, 00005, 00010, and 00012 are present in the primary image folder of the recording server, in gathering complementary split data, the place between serial numbers 00005 and 00010 where the longest interval is present is complemented, and hence serial number 00008 close to the present time instant is a target between serial numbers 00007 and 00008. Note that the moving image splitting device always complements the beginning split data and the last split data in the primary picture data generating unit in top priority. As described above, when fast and last split data in generating unit of a primary picture data are present in the split data remaining in the storage device 410, the CPU 401 of the moving image splitting device transfers the beginning split data and the last split data as complementary split data in priority to the recording server. The CPU 401 of the moving image splitting device selects split data from the split data remaining in the storage device 410 with reference to the continuity of a sequence (e.g. the serial numbers) allocated to the split data remaining in the storage device 410, and transfers the selected split data as complementary split data to the recording server. In the processing, for example, the CPU 401 of the moving image splitting device selects complementary split data from a group with split data with a continuous sequence allocated in the split data remaining in the storage device 410.

(Step 7)

In Step 4, in the case in which the primary picture data generating unit time is elapsed, the recording server sends a split data delete request to the moving image splitting device to delete a predetermined piece of split data. In principle, all pieces of the split data in the accumulation data folder of the moving image splitting device are transmitted to the recording server, and the split data is joined and accumulated based on a group of latest split data gathered at a scheduled time and a group of complementary split data complementarily gathered between pieces of latest split data. Thus, the moving image splitting device deletes the split data in the accumulation data folder. Since the accumulation data folder is periodically vacant, the vacant capacity of the moving image splitting device is increased. Also when complementary split data is incompletely gathered after a lapse of the primary picture data generating unit time due to troubles, for example, the moving image splitting device deletes the split data in the accumulation data folder. In this case, picture skips that occur in association with a loss of data occur in the primary picture data accumulated in the primary picture data folder. After the split data is deleted, the process goes to Step 8.

(Step 8)

Here, the process returns to Step 3. In the case in which a predetermined time period is not elapsed, the recording server sleeps until a lapse of the time.

(Step T)

The recording server joins primary picture data for every certain time period (e.g. ten minutes) and converts the primary picture data into secondary picture data compressed in a moving image format with a time stamp at the timing when loads are not concentrated, and accumulates the data in the secondary picture data folder.

As described above, the moving image splitting device according to the embodiment is connected to the cameras of the camera group that captures moving images, and connected to the information processor through the network, and the device has the CPU 410 that is an example of a processor. The CPU 401 repeats requesting the camera to send a moving image, acquiring the captured moving image from the camera, detecting an I frame from the acquired moving image, creating split data with a sequence allocated in order of captured time in GOP units including the I frame, and accumulating the created split data on the storage device. In response to the request for split data from the recording server, the CPU 401 extracts split data from the storage device with reference to the sequence allocated to the split data, and transfers the extracted split data to the recording server.

Note that the primary image data and the secondary picture data that are accumulated are transmitted to the terminal, and the data can be replayed, rewound, and fast forwarded.

(Effect)

According to the embodiment, stable gathering of monitor camera pictures in cloud environments is enabled.

According to the embodiment, in transmission of recording server data from the camera, data can be gathered at the maximum even in environments in which the line between the moving image splitting device and the recording server is unstable. Consequently, data transmission resistant to the deterioration of line status is enabled, and stable data accumulation on the cloud server over the Internet line (WAN) is enabled. Installation of the recording server at a local site is unnecessary, and the degree of freedom is improved. Data is split such that reconstruction of pictures of high image quality is enabled. With the order of transmission after the moving image splitting device splits a moving image, the transmission timing, and processing at the recording server, the latest images of high image quality can be always transmitted to the terminal, and images can also be smoothly confirmed on moving images.

Note that the embodiment is not limited to the embodiment, and various modifications are enabled in the scope not deviating from the gist of the invention. The components of the embodiments can be freely combined in the scope not deviating from the gist of the invention.

For example, pictures acquired from the camera group that captures moving images is preferably transmitted to the moving image splitting device in accordance with H.264, which is non-limiting. The transmission may be in accordance with MotionJPEG or MPEG2. Pictures may be continuously transmitted to the moving image splitting device in accordance with a method considered to be equivalent to the baseline profile in accordance with H.264, i.e. in accordance with a method in combination of a full image considered to be equivalent to an I frame and a differential image considered to be equivalent to a P frame. The compression format is preferably H.264 that is high compression at the present point, because the H.264 format is lightweight and easily implemented on both of hardware and software. However, compression may be performed by another method according to a transmission method of data to the moving image splitting device.

What is claimed is:

1. A moving image splitting device connected to cameras of a camera group that captures moving images and connected to an information processor through a network, the moving image splitting device comprising a processor, wherein
the processor requests the camera to send a moving image and acquires a captured moving image from the camera,
the processor repeats detecting an I frame from the acquired moving image, creating split data with a sequence allocated in order of captured time in a GOP unit including an I frame, and accumulating the created split data on a storage device,
in response to a request for split data from the information processor, the processor extracts split data from the storage device with reference to the sequence allocated to the split data, and
the processor transfers the extracted split data to the information processor,
wherein
the processor transfers split data one by one as complementary split data from the storage device to the information processor every time when receiving a complementary picture request from the information processor.

2. The moving image splitting device according to claim 1, wherein
in transfer of the complementary split data, when fast and last split data of generating unit of a primary picture data generated at the information processor are present in split data remaining in the storage device, the processor transfers the beginning split data and the last split data as the complementary split data in priority to the information processor.

3. The moving image splitting device according to claim 1, wherein
in transfer of the complementary split data, the processor selects split data from split data remaining in the storage device with reference to continuity of a sequence allocated to the split data remaining in the storage device, and transfers the selected split data as the complementary split data to the information processor.

4. The moving image splitting device according to claim 1, the split data comprising a single I frame.

5. The moving image splitting device according to claim 1, the split data comprising a single GOP unit.

6. A monitoring method using a monitor camera system having a camera group that captures moving images, a moving image splitting device connected to cameras of the camera group, and an information processor connected to the moving image splitting device through a network, the monitoring method comprising:
a moving image acquiring step in which the moving image splitting device requests the camera to send a moving image and acquires a captured moving image from the camera;
a split data creating step in which the moving image splitting device repeats detecting an I frame from the acquired moving image, creating split data with a sequence allocated in order of captured time in a GOP unit including an I frame, and accumulating the created split data on a storage device;
a scheduled-time-gathering requesting step in which the information processor requests the moving image splitting device to send split data;
a split data extracting step in which every time when receiving a request for split data from the information processor, the moving image splitting device extracts split data from the storage device with reference to the sequence allocated to the split data;
a split data transferring step in which the moving image splitting device transfers the extracted split data to the information processor;
an image saving step in which every time when receiving the split data, the information processor extracts an I frame and saves the I frame as primary image data;
a complementary split data gathering requesting step in which the information processor repeatedly requests the moving image splitting device to send complementary split data;
a complementary split data transferring step in which every time when receiving a request for complementary split data from the information processor, the moving image splitting device transfers split data one by one as complementary split data from the storage device to the information processor at timing other than timing of the split data transferring step;
an image saving step in which every time when receiving the complementary split data, the information processor extracts an I frame and saves the I frame as primary image data; and
a picture saving step in which the information processor joins split data transferred in the split data transferring step to the complementary split data for each of primary picture data generating unit times and saves the joined split data as primary picture data.

7. The monitoring method according to claim 6, further comprising:
a delete request step in which the information processor requests the moving image splitting device to delete split data in the storage device every lapse of the primary picture data generating unit time; and
a deleting step in which in response to a delete request for split data from the information processor, the moving image splitting device deletes the split data from the storage device.

8. The monitoring method according to claim 6, wherein
in the complementary split data transferring step, when fast and last split data in the primary picture data generating unit are present in split data remaining in the storage device, the beginning split data and the last split data are transferred as the complementary split data in priority to the information processor.

9. The monitoring method according to claim 6, wherein
in the complementary split data transferring step, split data is selected from split data remaining in the storage device with reference to continuity of a sequence allocated to the split data remaining in the storage device, and the selected split data is transferred as the complementary split data to the information processor.

10. The monitoring method according to claim 6, the split data comprising a single I frame.

11. The monitoring method according to claim 6, the split data comprising a single GOP unit.

* * * * *